March 14, 1950 — J. V. ROOK — 2,500,619
BRAKE LEVER CONTROL FOR GASOLINE SUPPLY FOR MOTOR VEHICLES
Filed Jan. 13, 1948 — 2 Sheets-Sheet 1
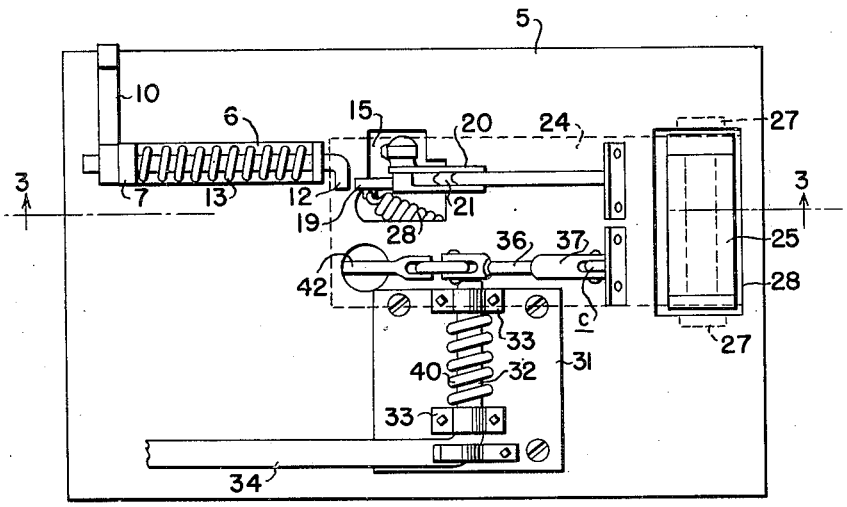
FIG. I.
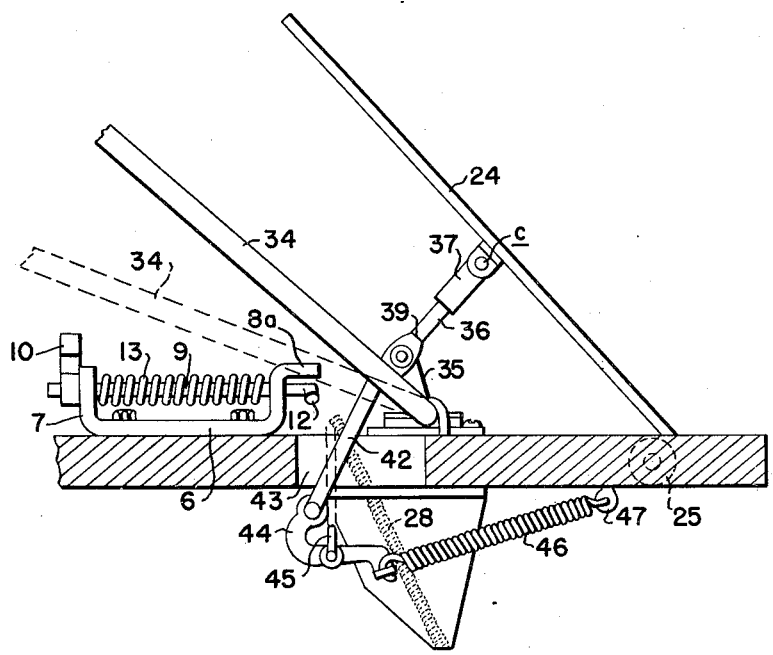
FIG. 2.
INVENTOR
JOSEPH V. ROOK
BY Walter N. Haskell.
ATTORNEY March 14, 1950 J. V. ROOK 2,500,619
BRAKE LEVER CONTROL FOR GASOLINE
SUPPLY FOR MOTOR VEHICLES
Filed Jan. 13, 1948 2 Sheets-Sheet 2

INVENTOR
JOSEPH V. ROOK

BY Walter N. Haskell,

ATTORNEY

Patented Mar. 14, 1950

2,500,619

UNITED STATES PATENT OFFICE 2,500,619

BRAKE LEVER CONTROL FOR GASOLINE SUPPLY FOR MOTOR VEHICLES

Joseph V. Rook, Coal Valley, Ill.

Application January 13, 1948, Serial No. 1,916

5 Claims. (Cl. 192—3)

My invention has reference to a brake lever control for the gasoline supply for motor vehicles, and is an improvement on a similar device for which Letters Patent of the United States were issued to myself on the eighth day of March, 1932, numbered 1,848,201. One of the advantages of the present invention lies in the simplicity of parts made use of in the structure and the greater ease of operation thereof. The apparatus is provided with means for imparting movement to the gasoline feed controls in the first instance, for independent action thereof, and a secondary phase taking in the brake controls and preventing operation of the gasoline feed controls. This is accomplished by one action of the foot on a single pedal, with the gasoline controls acting first, as when the car is being started, and followed by the setting of the brakes when needed.

Another feature of the invention consists in a set of springs for returning various parts to a normal position, which attain positions of inertia, whereby the tension of such springs on the foot-pedal is virtually relieved, and such foot-pedal is capable of great freedom of operation.

The same advantages can be claimed for the present apparatus as were set forth for the former device, such as a quick shut off of the fuel supply and application of the brakes, without shifting the foot from one pedal to another, utility in backing out from a curb or garage, operating on an incline, and the like.

The foregoing features and advantages are more fully set forth in the following specification, taken in connection with the accompanying drawing, in which is disclosed the invention in its preferred embodiment. Changes can be made therein without departing from the spirit of the invention, as set forth and claimed herein. In said drawing;

Fig. 1 shows the invention in plan view, with part of the superstructure in broken lines.

Fig. 2 is a side elevation thereof.

Figure 3:
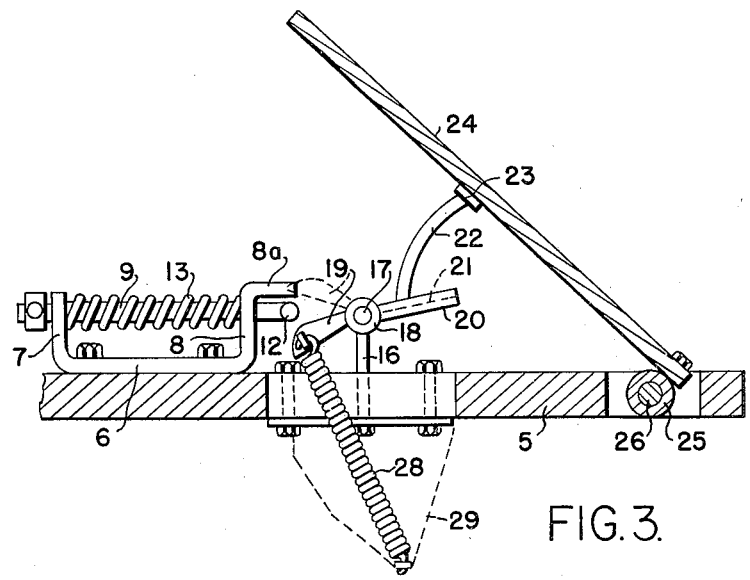
Fig. 3 is a detail of the gasoline feed controls on the broken line 3—3 of Fig. 1.

The reference number 5 indicates a base-board, such as the floor-board of an automobile, upon which is fixed a plate 6, provided at its ends with supports 7 and 8, in which is rockingly mounted a rod 9, the outer end of which is turned into an arm 10, ending in an eye 11, for attachment with connections leading to the throttle-valve control of an internal combustion engine with which the vehicle is equipped, and not shown in the drawing. The other end of the rod 9 is bent into a short crank-arm 12, in the same plane as the arm 10, but turned oppositely therefrom. The rod 9 has a limited movement longitudinally and is held yieldably against such movement and returned to a normal position after being shifted by a coiled spring 13 on said rod, fixed at one end to the support 7 and at the other end to the rod 9. Said spring also stores power upon the rod being rotated, to restore same to its usual position after being rocked. The support 8 is provided with an angular extension 8a which limits the movement of the end 12 of the rod upwardly.

Supported in an opening 15 in the board 5 is a post 16 in the upper end of which is secured a small shaft 17, on which is rotatably mounted a barrel 18, to one side of which is fixed a cam 19, the end of which is engageable with the crank-arm 12. Carried by the barrel 18 oppositely to the cam 19 is an arm 20, having a channel 21 in its upper face which is engaged by the rounded end of an arcuate arm 22, fixed to the lower face of a pedal plate 24, as by a fastening at 23, with the pedal-plate shown in broken lines in Figure 1. Upon the pedal-plate 24 being forced downwardly the barrel 18 is rocked in a direction to carry the cam 19 upwardly into the position shown in broken lines in Fig. 3. In this movement of the crank-shaft the rod 9 is forced outwardly by the curved end of the cam engaging the same with a prying movement, with the rod slipping inwardly again when the cam has passed, and the cam engaging the upper side of the crank 12 as shown in broken lines in Fig. 3. As the foot-pedal is permitted to rise again the cam forces the crank 12 downwardly, rocking the shaft 9, and opening the throttle valve. The degree of opening of such valve can be controlled by the amount of raising and lowering of the pedal, as governed by the foot.

Operable in an opening near one end of the board 5 is a barrel 25, rockingly supported on a shaft 26, supported by brackets 27 at the ends of said opening, fixed to the lower face of said board. The pedal-plate is fixed to said barrel near its lower end, and capable thereby of the usual pedal movement.

Figure 4:
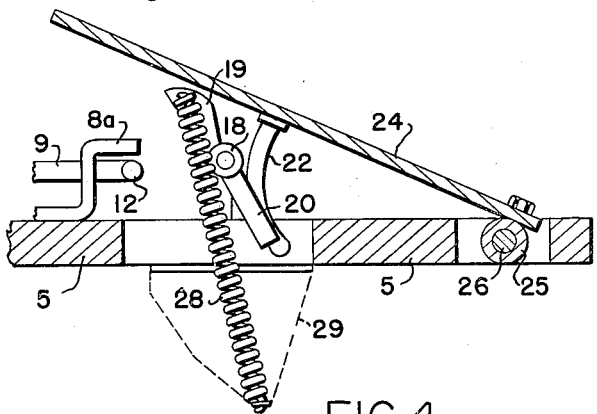
Fig. 4 is a similar view with the parts in shifted position.

A coiled spring 28 is connected at its upper end with an eye in one side of the cam 19, and passes downwardly through an opening in the board 5 to a connection with a fixture at the lower end of a bracket 29 fixed to the lower face of said board. In the upward movement of the cam 19 power is stored in said spring, causing a return of the cam and appurtenant parts to their original positions. When the pedal arm is forced downwardly the arm 20 is also lowered by means of the arm 22, the end of which travels in the channel 21, until the lower end of said arm 22 is nested in said channel, with the two arms in a virtually folded position. At this time the cam 19 is at its highest point, as in Fig. 4, which occurs when the brakes are being set. In this position the spring approaches the pivotal point or dead center, and with the arms 20 and 22 in an inactive position, the pedal 24 is relieved of practically all tension which might be received from the spring 28, and a freely rocking action of the pedal is secured.

The movement of the cam 19 to open the throttle valve is also against the force of the spring 13, and upon the force being removed the arm 10 is again turned downwardly with the fuel feed at its lowest point.

Also attached to the upper face of the board 5 is a plate 31, on which is rockingly mounted a shaft 32, by means of bearings 33 fixed on said plate. One end of said shaft is formed at a right angle into an arm 34, for connection with the brake apparatus of a motor vehicle, in a manner not shown in the drawing herein, but in a conventional manner. The upward movement of the arm 34 is limited by a curved detent 34a fixed on the plate 31 at the end of said arm. The opposite end of the shaft 32 is bent upwardly into a shorter arm 35 having a flattened upper end with a pivotal connection with one end of an arm 36 which is telescopically engaged with a tubular rod 37, which is supported from the lower face of the pivot-plate 24 by a pivotal connection at c. In the downward movement of the rod 37 the lower end comes in contact with a shoulder 39 on the end of the rod 36, forcing the same downwardly as the pressure on the pedal-plate is increased, rocking the shaft 32, and moving the arm 34 downwardly, as in broken lines in Fig. 2. This results in a prompt setting of the brakes, with the fuel feed apparatus out of operation. The proportionate length of the arms 34 and 35 is approximately one of the latter to five or six of the former, so that a slight movement of the shorter arm gets a quick response, with less movement of the pedal required.

Figure 5:
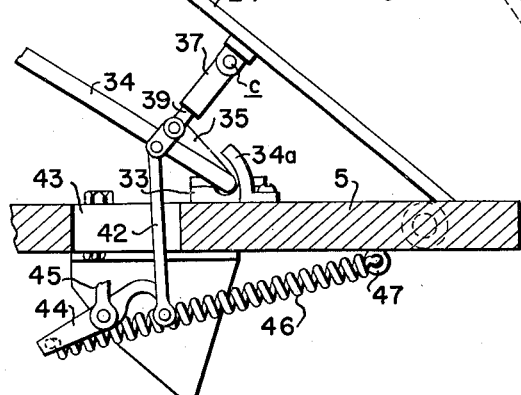
Fig. 5 is a detail of the brake control mechanism in side elevation.

A coiled spring 40 connects the rock-shaft 32 with the plate 31, which spring is provided with stored power for returning such shaft and the arms 34 and 35 to their original positions after the shaft has been rocked. The downward movement of the arm 34 increases such power. The force of the spring 40 is counterbalanced by means of an equalizing apparatus including a rod 42 having a pivotal connection at its upper end with the bearing on the end of the arm 35, passing downwardly through an opening 43 in the board 5, and pivoted at its lower end to one end of a rock-arm 44, fulcrumed on the lower turned end of a vertical rod 45 supported from the board 5. To the other end of said rock-arm is secured one end of a tension spring 46, the opposite end of which is attached to a fixture 47 on the lower face of the board 5. When the pedal 24 is forced downwardly in setting the brakes, the parts are moved into the position shown in Fig. 2, with the spring 46 idle, and as the pressure on the pedal is released the spring 40 rocking the arm 35 moves the rod 42 upwardly and with a continued movement inverts the position of the rock-arm 44, expanding the spring 46 and causing it to approach a dead center with the fulcrum point, as in Fig. 5. At this time the brake mechanism is out of action, and the force of the spring 46 is utilized chiefly in counteracting the force of the spring 40, exerting a restraining influence thereon until the arms 34 and 35 are restored to their normal positions. With the spring 46 at or near the position shown in Fig. 5 little if any of the tension of such spring is imparted to the rod 42, and through such rod to the pedal-plate, and such plate is free to be moved up or down without any restraining influence from said spring. It is to be noted that during the greater part of the operation of the fuel feed devices, or of the brake operating devices, the springs for storing power in connection with said operations are out of action, so far as any restraint upon the free movement of the pedal-plate is concerned, although they work independently of each other.

It is also to be noted that the fuel feed control devices are free to work independently of the brake mechanism at all times, and that the pedal-plate can be moved upwardly or downwardly at will by the foot of the operator, with only the feed devices in effect, so long as the rod 37 does not contact the shoulder 39, but the brakes can be quickly set without change of foot from one pedal to another if necessity requires. In setting the brake the cam 19 approaches its extreme movement, and as soon as the brake connection is broken the cam begins to function, so that the change from fuel control to brake operation or the reverse is instantaneous.

What I claim and desire to secure, is:

1. In combination with a base-board and pedal-plate rockingly mounted thereon, a rock-shaft adapted for connection with the fuel controls of an internal combustion engine, provided at one end with a cam contacting head, a spring on said shaft permitting a yielding rocking movement to the shaft and a limited lengthwise movement, a barrel and cam projected therefrom engageable with the head of said shaft, to operate the same upon the return movement of the pedal-plate, a plate projected from said barrel oppositely to the cam, an arcuate rod carried by the pedal-plate engageable with said plate to rotate the barrel, and a coiled spring connecting said cam with a fixture on the base-board and storing power upon the cam being actuated to return the cam and the pedal plate to their original positions.

2. In a device of the class described, the combination with a base-board and pedal-plate rockingly mounted thereon, of a support and rock-shaft thereon adapted for connection with the engine of a motor-vehicle, for control thereof, and provided at one of its ends with a cam contacting crank, a spring on said shaft permitting a yieldable rocking movement and a limited endwise movement of the shaft, a barrel rockingly supported on said base-board, and a cam projected from said barrel for engagement with said crank, operable to rotate the shaft upon a return movement of the cam, a channel-plate projected from said barrel oppositely to the cam, an arcuate rod supported from the pedal-plate engaging said channel-plate with its free end, and a tension spring connecting said cam with the base-board and storing power upon the cam being operated, to return said cam and the pedal-plate to their normal positions, with the latter part of the outward movement of the spring approaching a dead center, with the pedal-plate free to be moved without hindrance from the tension of such spring.

3. In a device of the class described, in combination with a base-board and pedal-plate rockingly mounted thereon, connections between said pedal-plate and the feed control devices of an internal combustion engine, a rock-shaft on said base-board provided at one of its ends with an arm for connection with the actuating devices of the brake system of a motor vehicle, means connected with said pedal-plate for rocking said shaft, including means for giving a secondary movement thereto following a primary movement of the fuel feed control devices, a coiled spring on said rock-shaft tending to hold the same in normal position, and an equalizing apparatus connected with said last-named means, including a tension spring acting as a counterbalance to the spring on said rock-shaft.

4. In a device of the class described, in combination with a base-board and pedal-plate rockingly mounted thereon, connections between said pedal-plate and the feed control devices of an internal combustion engine, a rock-shaft on said base-board provided at one of its ends with an arm for connection with the actuating devices of the brake system of a motor vehicle, a relatively short arm at the other end of said rock-shaft, connections between said last-named arm and said pedal-plate, including a telescoping rod permitting an initial movement to the fuel feed mechanism, a coiled spring on said rock-shaft tending to hold the same yieldably against being rocked, and an equalizing apparatus including an arcuate rod connected at one end to said last-named arm, and extending downwardly for connection with a rock-arm, and a coiled spring connecting said rock-arm with a fixture on the base-board and counterbalancing the force of said first-named rock-shaft spring, said last-named spring being capable of approaching a dead center in the setting of the brakes to relieve the pedal-plate from the tension thereof.

5. In a device of the class described, a base-board and pedal-plate rockingly supported thereon, a rock-shaft supported on said base-board adapted for connection with the fuel feed control of an internal combustion engine, spring means permitting yieldable action of the rock-shaft, actuating devices connected with the pedal-plate including a cam for operation with said rock-shaft, a tension spring connected with said cam for returning the same to a normal position, with the spring approaching a dead center near its extreme movement permitting the pedal-plate to act free from the tension thereof, a rock-shaft on said base-board provided at one of its ends with an arm adapted for connection with the brake devices of a motor vehicle, a coiled spring on said rock-shaft for holding the same yieldably against being rocked, a relatively short arm at the opposite end of said rock-shaft, connections between said last-named arm and the pedal-plate, including a telescoping rod permitting an initial movement to the fuel feed devices, and imparting a secondary movement to the brake actuating devices, an arcuate rod connected with said last-named arm, projected downwardly through an opening in the base-board, an arm rockingly supported from said base-board, connected at one of its ends with said rod, and a tension spring connecting the other end of said rock-arm with a fixture on said base-board, for equalizing the force of the spring on the last-named rock-shaft, said spring being capable of approaching a dead center upon the brakes being set, to relieve the pedal-plate from hindrance of the tension of said spring.

JOSEPH V. ROOK.

REFERENCES CITED

The following references are of record in the file of this patent:

UNITED STATES PATENTS

| Number | Name | Date |
| --- | --- | --- |
| 1,848,201 | Rook | Mar. 8, 1932 |